Nov. 7, 1944.   C. M. MacCHESNEY ET AL   2,362,388
METHOD OF AND APPARATUS FOR WELDING
Filed Sept. 19, 1941   5 Sheets-Sheet 1
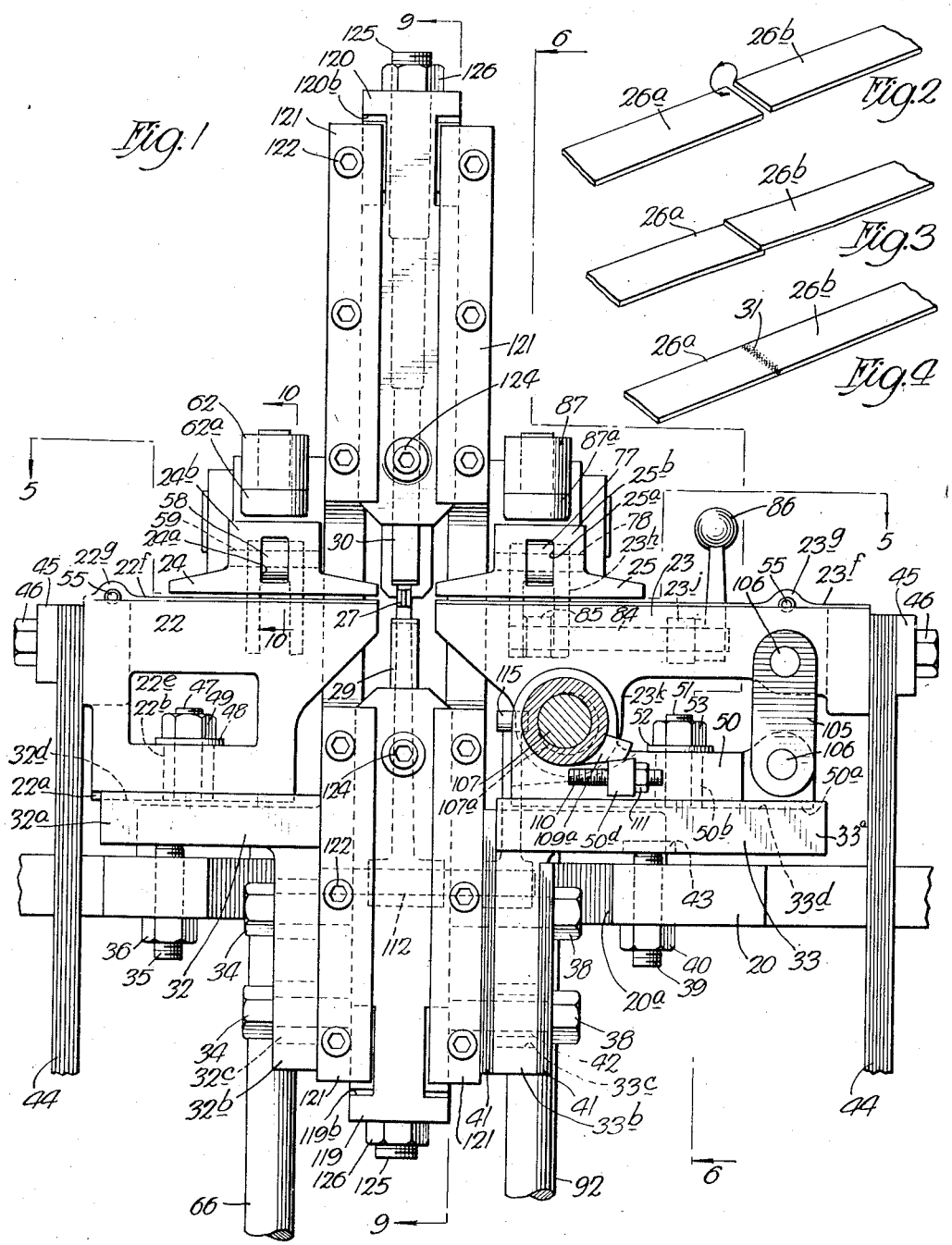
INVENTORS.
Chester M. MacChesney
William Schroeder
BY
Davis, Lindsey, Smith & Shonts,
ATTORNEYS.

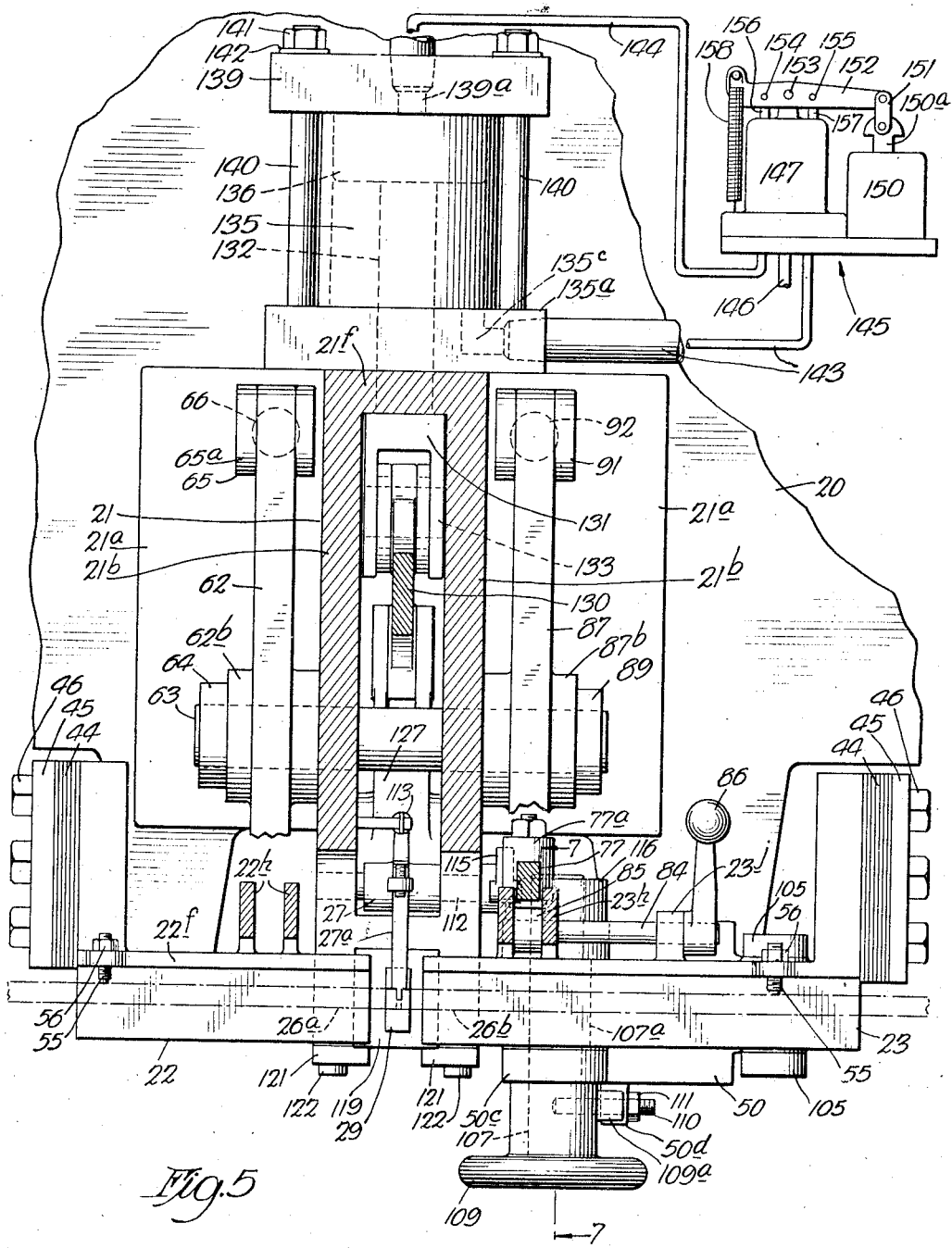

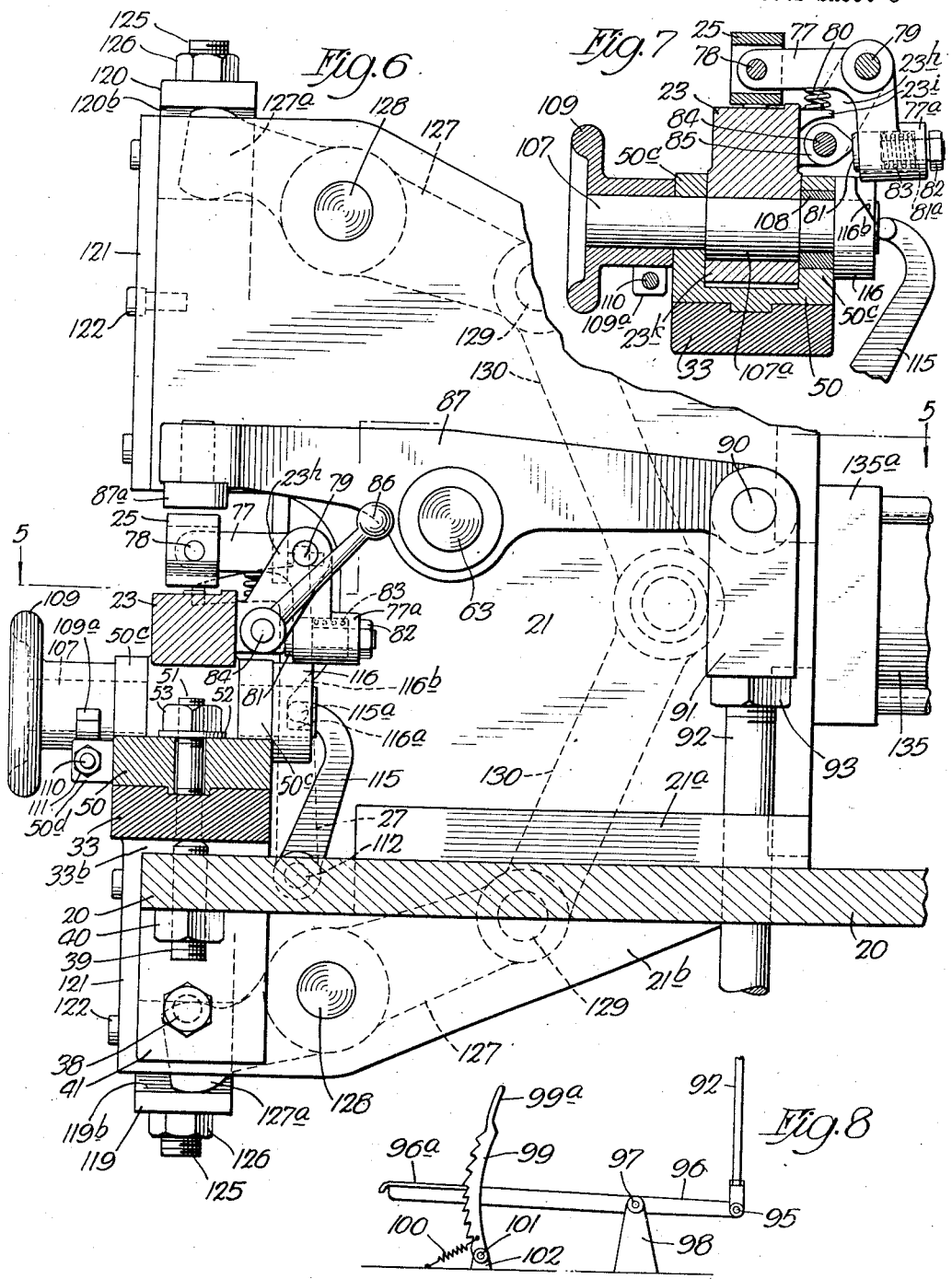

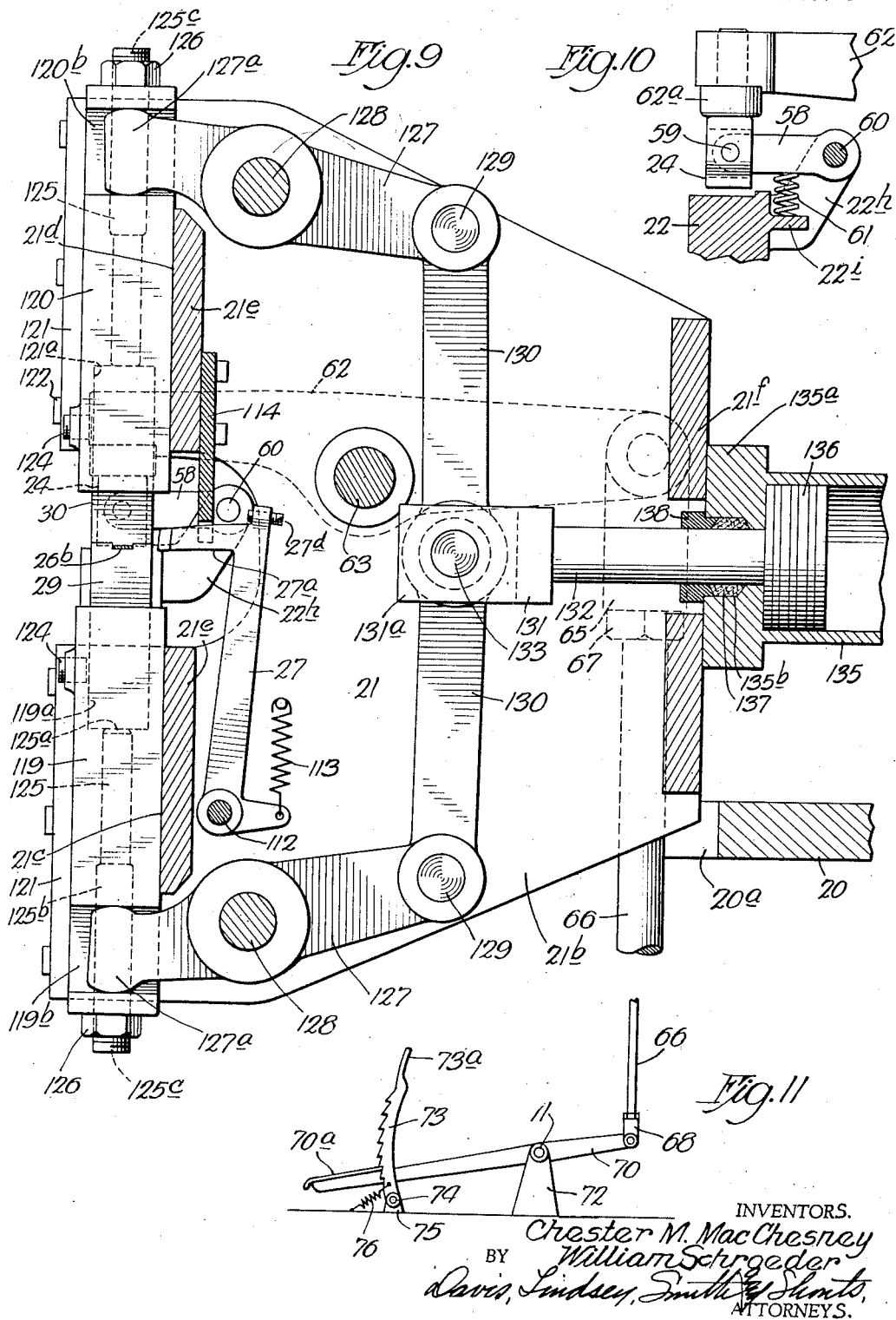

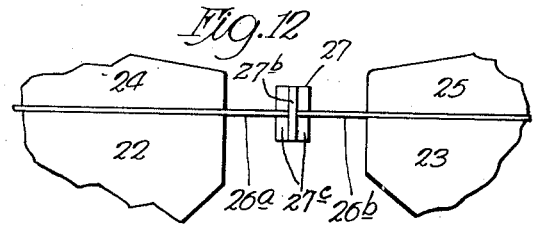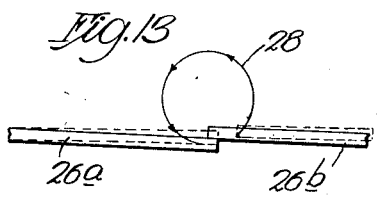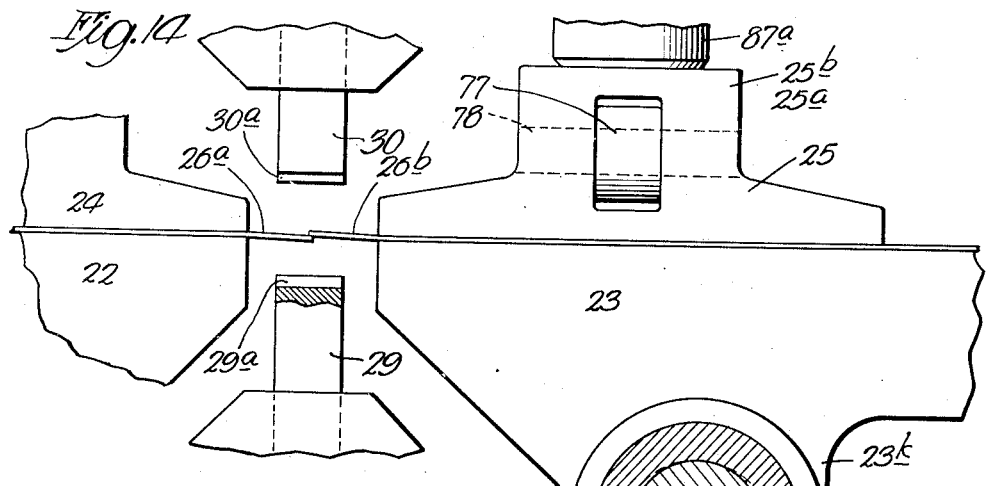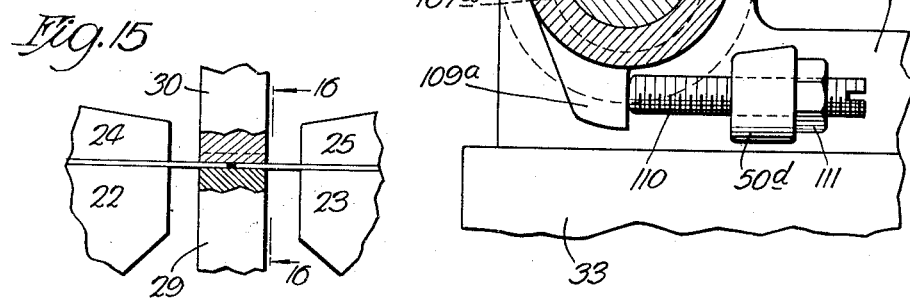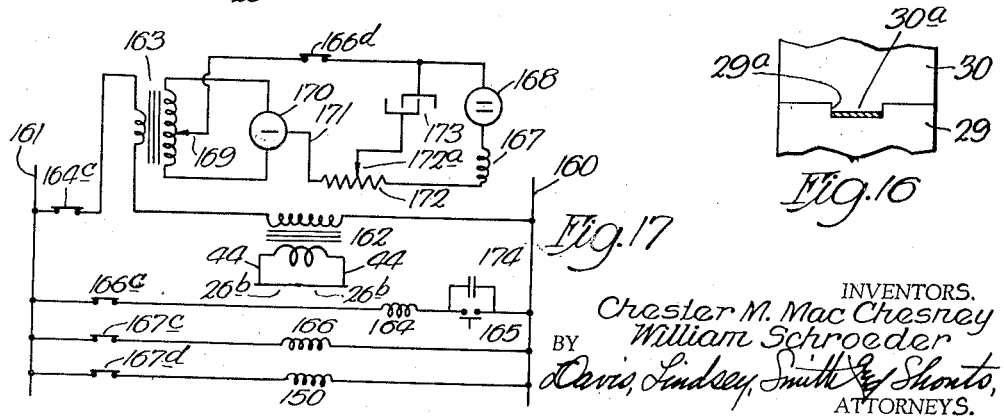

Patented Nov. 7, 1944

2,362,388

UNITED STATES PATENT OFFICE 2,362,388

METHOD OF AND APPARATUS FOR WELDING

Chester M. MacChesney and William Schroeder, Chicago, Ill., assignors to Acme Steel Company, Chicago, Ill., a corporation of Illinois Application September 19, 1941, Serial No. 411,474

19 Claims. (Cl. 219—4)

This invention relates to improvements in welding apparatus and methods of welding, and its purpose is to provide improved means for producing what may be termed a forged lap joint uniting adjacent sections or lengths of strip steel or the like.

In the practice of cold rolling strip steel, or during the fabrication of said steel, as carried on its steel mills and other plants, it is necessary at frequent intervals to unite the ends of separate strips so that a very great length of strip material may be formed to be wound in a coil or otherwise used. It has heretofore been the usual practice to unite the ends of two such strips by butt welds but this method has proved unsatisfactory because the tensile strength of the composite strip at the joint does not consistently approach the strength of the body portions of the strips which are thus united. These welding operations are carried on at temperatures of approximately 2500° Fahrenheit, which exceeds the melting point of the metal so that the metal melts and flows during the welding operation, but a complete and satisfactory union of the metal of the two strips has not been attained by this practice, due in part to the fact that it is necessary to grip the ends of the metal strips in proximity to the place where they abut against each other so that the gripping devices cool the metal close to the joint and cause narrow zones of weakness to be produced on opposite sides of and close to the joint, in which zones subsequent failure usually occurs.

The principal object of the present invention is to overcome the above-mentioned difficulties, and others, by providing an improved method of procedure according to which the ends of the strips are overlapped and united by a forging operation with the metal of the strip ends heated only to a forging or plastic heat, that is, to a temperature of approximately 2000° F. During this operation the strips may be gripped or held at substantial distances from their extremities so that the heat produced by welding may be gradually dissipated through a considerable length of strip material without the objectionable cooling of the strip close to the joint which is characteristic of butt welding operations. A further object of the invention is to provide an improved method and an improved apparatus for forming a welded joint of a strength approximating that of the metal strips which are united and having substantially the same width and thickness. Still another object of the invention is to provide means for overlapping to a predetermined extent the ends of the strips to be connected, then heating them by the passage of an electric current therethrough, and then uniting them by a forging operation. A further object is to provide means for causing the ends of the strips to have a wiping action upon each other when they are brought into the overlapping relationship, thereby insuring a good contact between the metal strips before they are heated and forged. Another object of the invention is to provide means for effecting a predetermined heating of the overlapping strip ends by the passage of a measured electric current therethrough prior to the forging or welding step. A further object is to provide improved clamping means for holding the ends of the metal strips and effecting a relative movement thereof to bring them into overlapping relationship. Still another object is to provide a stop for accurately positioning the ends of the strips to be united in combination with clamping means for holding the strip ends and means for withdrawing the stop and effecting a relative movement of the clamping means to bring the strip ends into a definite or predetermined overlapping relationship. Another object is to provide improved fluid operated mechanism for actuating the dies by which the foregoing operation is effected. Other objects relate to various features of construction and arrangement which will appear more fully hereinafter.

The nature of the invention will be understood from the following specification taken with the accompanying drawings in which one embodiment of the improved apparatus and one example of the improved method are illustrated. In the drawings, Figure 1 shows a partial front elevation of the improved welding machine, the supporting frame or standard and the electric circuit connections being removed;

Fig. 2 shows a perspective view of the two strip ends during the operation of effecting a relative movement thereof to bring them into overlapping relationship;

Fig. 3 is a perspective view of the strip ends shown in Fig. 2 after they have been overlapped;

Fig. 4 is a perspective view of the strip ends illustrated in Fig. 3 after they have been united by the lap forge welding operation of the present invention;

Fig. 5 is a horizontal section taken on the line 5—5 of Fig. 1 and 5—5 of Fig. 6;

Fig. 6 shows a vertical section taken on the

Fig. 7 shows a vertical section taken on the line 7—7 of Fig. 5;

Fig. 8 shows a side elevation of the foot lever mechanism by which the clamping device shown in Fig. 6 is operated;

Fig. 9 shows a vertical section taken on the line 9—9 of Fig. 1;

Fig. 10 is a detailed section taken on the line 10—10 of Fig. 1;

Fig. 11 shows a partial side elevation of the foot lever mechanism for operating the clamping device illustrated in Fig. 9;

Fig. 12 shows a somewhat diagrammatic front elevation of a portion of the apparatus illustrated in Fig. 1, showing the two strip ends being positioned against the opposite sides of the removable stop;

Fig. 13 is a side elevation of the two strip ends illustrating on an enlarged scale the relative movement of these strip ends during the operation of bringing them into overlapping relationship;

Fig. 14 is an enlarged front elevation of a portion of the welding apparatus showing the clamps for holding the strip ends and the welding dies in their retracted positions preliminary to uniting the strip ends by a forging action;

Fig. 15 is a partial front elevation similar to that of Fig. 14, showing the welding dies after they have been rocked together to effect the welding of the overlapping strip ends, as illustrated in Fig. 4;

Fig. 16 is a sectional view taken on the line 16—16 of Fig. 15; and

Fig. 17 is a diagrammatic view of the electric circuit connections of the system for causing a predetermined or fixed amount of electrical energy to pass through the overlapping portions of the metal strips preliminary to each forging operation.

As illustrated in the drawings, the improved welding apparatus comprises a horizontal supporting plate 20 which may be mounted upon legs or pedestals to act as a table for carrying the various parts of the apparatus. This plate is provided at its forward edge with a notch 20ª in which a part of the welding mechanism is located, and it carries a vertically extending double-walled frame or plate 21 having laterally extending flanges 21ª which are bolted or otherwise secured to the top surface of the horizontal plate 20, as shown particularly in Figs. 6 and 9, the lower part of the plate 21 extending downwardly through the notch 20ª. These supporting plates carry a pair of clamping blocks 22 and 23, shown particularly in Fig. 1, which are adapted to cooperate with the clamping members 24 and 25, respectively, to hold the strip ends 26ª and 26ᵇ which are to be united by the welding operation. When these strip ends 26ª and 26ᵇ are initially placed in the machine on the clamping blocks 22 and 23, they are located by positioning their ends against a removable gauge or stop member 27, as shown in Fig. 12. The clamping members 24 and 25 are then manipulated to hold the strip ends securely against the blocks 22 and 23, respectively, whereupon the gauge member 27 is withdrawn and the block 23 and clamping member 25 are moved through an arc 28, as shown in Fig. 13, so that the strip end 26ᵇ is carried upwardly and over the strip end 26ª and eventually brought down against the end 26ª with a reverse motion and a wiping action, as indicated by the arrows on the arc 28. The path of travel of the strip end 26ᵇ is such that it depresses the end 26ª as the end of the movement is reached so that a close contact and a definite overlapping relationship is brought about between the strip ends and they are caused to exert a resilient pressure on each other preliminary to the welding operation.

With the strip ends held in the overlapping relationship illustrated by full lines in Figs. 13 and 14, and with a substantial length of strip material between the clamping means, an electric current is then passed through the strip ends to heat them to the desired forging temperature, determined automatically as hereinafter described, and the welding dies 29 and 30 are then actuated to form a welded joint 31 having the characteristics illustrated in Fig. 4, where it will be seen that the material at the joint is of substantially the same width and thickness as other parts of the strip removed from the joint. To accomplish this, the lower die 29 is provided with a rectangular groove 29ª of the same width as the strip ends which are received within it and the upper die 30 is provided with a corresponding rectangular projection 30ª, as shown in Figs. 14, 15 and 16. The projection 30ª is adapted to enter and substantially fit the recess 29ª but the depth of the projection is less than the depth of the recess, leaving a space which corresponds substantially to the thickness of the strip 26. When the two welding dies are brought together, as shown in Figs. 15 and 16, their end faces abut against each other and the projection 30ª enters the recess 29ª to effect the welding of the overlapping strip ends and determine the thickness and width of the joint. Inasmuch as the overlapping ends are confined during this welding and forging operation, there is an endwise flow of the metal to permit it to accommodate itself to the confines of the space between the lower part of the recess 29ª and the projection 30ª. This endwise flow of the metal might be compensated for by permitting the simultaneous relative separation of the blocks 22 and 23 and their clamps 24 and 25 but, if these parts remain relatively stationary, the slight wrinkled effect which may be produced in the strip material adjacent the joint will ordinarily be found unobjectionable.

With the foregoing explanation of the general mode of operation of the apparatus, reference will now be had to the method of mounting and actuating the clamping devices. The clamping block 22 which carries the strip end 26ª is mounted directly upon a bracket 32 and the clamping block 23 is mounted, through the agency of intermediate parts, upon another bracket 33. These brackets comprise horizontally extending parts 32ª and 33ª, upon which the clamping devices are mounted, and vertically extending flanges 33ᵇ and 33ᵇ which are secured to the side walls 21ᵇ of the upright frame 21. The flange 32ᵇ is provided with elongated slots 32ᶜ engaged by studs 34 which enter threaded apertures in one of the side walls 21ª of the vertical frame, and this construction permits the bracket 32 to be adjusted vertically to permit the apparatus to accommodate different thicknesses of strips. The horizontal portion 32ª of the bracket is supported in all of these vertical positions by an adjusting screw 35 which threadedly engages an aperture in the base plate 20 and which is held in adjusted position by a lock nut 36, as shown in Fig. 1. Similarly, the flange 33ᵇ of the other supporting bracket 33 is provided with elongated slots 33ᶜ which are engaged by studs 38 entering threaded apertures in the other side wall 21ᵃ of the upright frame, thus permitting the bracket 33 to be adjusted vertically to accommodate different thicknesses of strip material. The bracket 33 is supported in a similar manner by a set screw 39 which engages a threaded aperture in the plate 20, being held in adjusted position by a lock nut 40. Inasmuch as the two clamping blocks 22 and 23 are to be connected in the electric circuit by which a current is passed through the strip ends which are to be welded together, it is necessary to insulate the supports for these blocks from each other and this is accomplished by means of sheets of insulating material 41 which are interposed between the flange 33ᵇ and the adjacent face of the frame 21 and also between the flange 33ᵇ and the heads of the studs 38. Insulating bushings 42 are mounted in the slots 33ᶜ around these studs so that the bracket 33 is thus insulated from its support. To complete this insulation, an insert 43 of insulating material is mounted in a recess in the bottom of the horizontal portion 33ᵃ of the bracket 33 for engagement by the supporting stud 39. The electric welding circuit is connected directly to the clamping blocks 22 and 23. For this purpose, the secondary winding of the transformer included in the welding circuit, as hereinafter described, is connected to laminated bars 44 which are attached to the end faces of the blocks 22 and 23 by means of plates 45 and studs 46.

The horizontal portion 32ᵃ of the bracket 32 has a longitudinally extending groove 32ᵈ formed in its upper side and adapted to be fitted by a corresponding projection or rib 22ᵃ formed on the underside of the clamping block 22. The lower part of the clamping block is provided with an elongated slot 22ᵈ adapted to receive a bolt or stud 47 which extends upwardly into an opening 22ᵉ formed in the lower part of the block 22. A washer 48 and a nut 49 engage the threaded upper portion of this stud for clamping the block 22 in adjusted position on the bracket 32. By this arrangement the block 22 may be adjusted longitudinally toward and from the gauge or stop member 27 previously referred to. The other clamping block 23 is carried by an intermediate member 50 which is similarly provided on its underside with a downwardly extending rib or projection 50ᵃ arranged to enter a groove or keyway 33ᵈ formed in the upper side of the horizontal portion 33ᵃ of the other supporting bracket. A bolt or stud 51 extends upwardly from the bracket 33 through an elongated slot 50ᵇ which is formed in the intermediate member 50 and the threaded portion of the bolt or stud 51 is engaged by a washer 52 and a nut 53 which permit the intermediate member 50 to have a longitudinal adjustment on the bracket 33 for the purpose of bringing about a corresponding adjustment of the clamping block 23 similar to the previously described adjustment of the block 22.

The clamping blocks 22 and 23 are provided along their rear edges with upwardly extending shoulders 22ᶠ and 23ᶠ, respectively, and these shoulders are enlarged at spaced intervals to form the bosses 22ᵍ and 23ᵍ. These bosses are provided with threaded apertures in which are mounted adjusting screws 55, shown in Figs. 1 and 5, which act as positioning members against which the lateral edges of the strip ends 26ᵃ and 26ᵇ are adapted to be positioned when they are placed in the machine. These positioning members are secured in adjusted position by lock nuts 56. When the strip ends are positioned against the members 55, with their ends engaging the gauge member 27, they are secured in those positions by moving the clamping members 24 and 25 downwardly to grip them on their upper sides.

As shown particularly in Figs. 1 and 10, the clamping member 24 is provided with a rectangular aperture 24ᵃ formed in the upwardly projecting body portion 24ᵇ thereof, and this aperture is adapted to receive the end of a lever 58 which is pivotally connected to the clamping member by a pin 59. The other end of the lever is pivotally connected by a pin 60 to a pair of ears 22ʰ which are formed integrally with the rear side of the clamping block 22. A flange 22ⁱ extends rearwardly between the two ears 22ʰ and a coil spring 61, secured on this flange, presses against the underside of the lever 58 to force the clamping member 24 upwardly away from the upper face of the block 22. The clamping member 24 is adapted to be forced downwardly against the compression of the spring 61 by a lever 62 having mounted on the free end thereof a plug 62ᵃ, formed of hard rubber or the like, which is adapted to engage the upper side of the clamping member. As shown in Figs. 5 and 9, the lever 62 is pivotally mounted upon a shaft 63 which is secured in the side frame members of the upright frame 21, the lever 62 being provided with a hub portion 62ᵇ at the point where it is pivotally mounted on the shaft. A collar 64 is secured on the end of the shaft to hold the lever 62 in position thereon. The rear end of the lever extends between a pair of ears 65ᵃ formed on the upper end of a coupling member 65 having a threaded connection at its lower end with a connecting rod 66, the rod being secured in adjusted position therein by a lock nut 67. The rod 66 extends downwardly and is pivotally connected through a coupling member 68 with a foot pedal 70. This foot pedal is pivoted at the point 71 upon a supporting pedestal 72 which is located on the floor or other support by which the frame of the machine is carried. The foot pedal 70 has a plate 70ᵃ adapted to be engaged by the foot of the operator and adjacent this plate there is mounted an upwardly extending ratchet member 73 having a handle 73ᵃ at its upper end. This ratchet member is pivoted at 74 upon a bracket 75 secured to the floor or other support and a coil spring 76 normally forces the ratchet member 73 toward the left, as shown in Fig. 11, so that one of its teeth will engage the edge of the plate 70ᵃ to hold the foot pedal 70 in adjusted position. By means of this arrangement, the operator may press downwardly on the foot pedal to actuate the lever 62 which will then force the clamping member 24 downwardly against the clamping block 22 which is seated on the bracket 32. When the desired pressure is obtained, the foot pedal 70 may be released and the ratchet member 73 will then hold the clamping member 24 in the desired position.

The other clamping member 25 is similarly provided with a rectangular aperture 25ᵃ in the body portion 25ᵇ thereof and this aperture receives the forward end of an operating lever 77 which is pivoted thereto by a pin 78. The lever 77, which is of bell crank form, is pivoted by a pin 79 between two ears 23ʰ which are formed on the block 23. A coil spring 80 is mounted on a flange 23ⁱ, extending rearwardly from the block 23, and it engages the lever 77 to cause the clamping member 25 to move normally away from the block 23. The depending arm of the lever 77 is provided with a head 77ª having formed therein a cylindrical bore in which is mounted a plunger 81. This plunger has a stem 81ª which extends through the end wall of the cylindrical bore and is engaged by a nut 82. A coil spring 83 mounted in the bore normally moves the plunger 81 out of the bore to the extent permitted by the adjustment of the nut 82 on the stem of the plunger. A shaft 84 is journaled in the previously described ears 23ʰ carried by the block 23 and also in another ear 23ʲ which extends rearwardly from this block, as shown in Fig. 5, and this shaft has mounted on it between the ears 23ʰ a cam 85 which is adapted to bear against the plunger 81. An operating handle 86 is secured upon the other end of the shaft 84, as illustrated in Figs. 1 and 5, and upon turning this handle the cam 85 may be utilized to rock the lever 77 about its pivot and thereby force the clamping member 25 downwardly until it grips the strip end 26ᵇ with a yielding pressure arising from the presence of the spring 83 in the connection between the cam and the clamping member. By this arrangement, the strip end 26ᵇ may be gripped between the block 23 and the clamping member 25 with sufficient pressure to hold it while the block 23 is being moved through the oscillatory path illustrated by the arc 28 in Fig. 13 for the purpose of bringing the strip ends into a substantially definite or predetermined overlapping relation with each other.

After that overlapping relation has been brought about, the clamping member 25 may be caused to engage the strip end with the pressure required during the welding operation by actuating a lever 87 which is mounted on the shaft 63 by which the corresponding lever 62 is carried. The lever 87 has an enlarged hub portion 87ᵇ engaged by a collar 89 which retains the lever in place on the shaft and the forward free end of the lever is provided with a pad 87ª of hard rubber or the like which is adapted to engage the upper side of the clamping member 25 and which serves to maintain the electrically insulated condition of the parts which grip the strip end 26b. The other end of the lever 87 is pivoted at 90 to a connecting member 91 which is threadedly engaged by a rod 92 adapted to be held in adjusted position therein by a lock nut 93. The rod 92 extends downwardly and is pivotally connected at the point 95 to a foot pedal 96 similar to the foot pedal 70 previously described. This foot pedal is pivoted at the point 97 on a pedestal 98 extending upwardly from the floor, and the free end of this foot pedal carries a plate 96ª adapted to be engaged by the foot of the operator and having an edge which is adapted to interlock with the teeth of the rack bar 99 provided with a handle 99ª. A coil spring 100 normally maintains the teeth of the rack bar in engagement with the plate 96ª and a pin 101 establishes a pivotal connection between the rack bar and the bracket 102 mounted on the floor. By swinging the rack bar 99 away from the plate 96ª, the foot pedal is released to permit the operator to actuate the lever 87 and thereby press the forward end of the lever downwardly against the clamping member 25. The rack bar 99 may then be caused to lock the pedal in this position so that the clamping member 25 will be firmly held during the welding operation.

As heretofore indicated, it is necessary to impart to the block 23, and parts carried thereby, a motion through the arc 28 illustrated in Fig. 13 in order to bring the strip ends into overlapping relationship and, for this purpose, the block 23 is mounted for relative movement with respect to the intermediate member 50 which is secured on the bracket 33. To permit this relative movement, the end of the block 23 which is farther away from the welding dies is supported from the member 50 by a pair of links 105 which are pivotally connected to the members 23 and 50 by pins 106. Adjacent its other end, the block 23 is provided with a downwardly extending projection 23ᵏ, shown in Figs. 1 and 7, which projects between a pair of flanges 50ᶜ formed on the member 50. A shaft 107 is journaled in the forward flange 50ᶜ and in a bushing 108 mounted in the other flange, and a hand wheel 109 is secured to the forward end of this shaft to permit it to be turned by the operator. The portion of the shaft 107 between its bearings is formed as an eccentric 107ª which is journaled in an aperture formed in the depending portion 23ᵏ of the block 23, so that when the hand wheel 109 is turned the eccentric portion 107ª will cause the block 23 to move the strip end 26b through the arcuate path shown in Fig. 13. When the block 23 is in its normal position, as shown in Fig. 1, the angular position of the shaft 107 is fixed by the engagement of a lug 109ª, formed on the handle, with a lug 50ᵈ which projects downwardly from the member 50. After the shaft 107 has been turned through the necessary arc to move the strip end 26ᵇ through the arcuate path shown in Fig. 13, the limiting angular position of the shaft 107 is determined by a stop screw 110 which threadedly engages the lug 50ᵈ and which is held in adjusted position by a lock nut 111. By adjusting the screw 110, the extent of angular movement of the shaft 107 and its eccentric portion 107ª may be regulated to cause the overlapping of the strip ends to take place in the desired manner. After the strip ends have been overlapped with the clamping member 25 held in its clamping position by the cam 85, the foot pedal 96 is operated to cause the lever 87 to hold the clamping member 25 securely in place while the welding operation is going on.

During the operation of bringing the strip ends into overlapping relation, it is necessary to remove the gauge member 27 against which the ends of the strip are positioned when they are first placed on the blocks 22 and 23. The member 27 is constructed in the form of a lever, as shown in Fig. 9, its lower end being pivoted on a pin 112 carried by the upright frame 21 and its upper end being bent transversely as shown at 27ª so that the vertical flange 27ᵇ forming its extremity may project into a position between the blocks 22 and 23 to be engaged by the ends of the strip. The shoulders 27ᶜ at the inner end of the flange 27ᵇ, shown in Figs. 9 and 12, serve to position the strip ends laterally so that they will line up properly with the recess 29ª in the lower forging die. To insure this result, the stop lever 27 is provided, as shown in Fig. 9, with a set screw 27ᵈ which engages a plate 114 carried by the frame member 21e when the lever is in its forward position and which may be adjusted to locate the shoulders 27ᶜ properly. A coil spring 113 extending between this lever and a stationary part of the machine serves normally to move the lever to a position where it will act as a gauge for positioning the strip ends. In order to move this gauge out of the paths of the strip ends during the overlapping operation, the pin or shaft 112 is provided at one end with a lever 115 which extends upwardly, as shown in Figs. 1 and 6, with its rounded end 115a extending into the recess of a cam 116 which is secured on the inner end of the shaft 107 by which the block 23 is moved through its oscillatory path. The cam 116 has a recess 116a to receive the extremity 115a of the lever arm and this recess has an inclined face 116b which is adapted to cooperate with the part 115a at a predetermined point during the rotation of the shaft 107 to rock the lever 115 about its axis to the position shown in Fig. 7 while at the same time retracting the gauge member 27 to the position shown in Fig. 9.

After the overlapping ends of the strips have been welded, in the manner more fully described hereinafter, the foot pedals 70 and 96 may be released by actuating the rack bars 73 and 99 so that the clamping members 24 and 25 will be released by the levers 62 and 87, respectively. The handle 86 may then be actuated to cause the cam 85 to release the clamping member 25 from the action of the lever 77 and the welded strip may then be removed. Then, upon turning the handle 109 in the appropriate direction, the block 23 may be restored to its normal position shown in Fig. 1 and during this operation the end of the lever 115 will again extend into the cam recess 116a and the gauge member 27 will be permitted under the influence of the spring 113 to return to its normal position shown in Fig. 1.

The welding dies 29 and 30 are carried by die blocks 119 and 120, respectively, which are mounted for vertical movement in guideways 21c and 21d which are formed in the forward portion of the upright frame 21, as illustrated particularly in Figs. 1 and 9. Each guideway is formed between the side plates 21b of the upright frame and they are each bounded on their rear sides by transverse flanges or webs 21e which are formed integrally with the side frame members. The guideways are bounded along their forward sides by plates 121 which are attached to the side plates 21b along their forward edges by socket studs 122 engaging threaded apertures in the side frame members. The plates 121 overlap the die blocks 119 and 120 and the inner edges of each pair of plates are spaced apart to form a vertical slot through which access may be had to the block mounted within the guideway.

The lower die block 119 is provided with a bore 119a in which is mounted the lower die 29, and the upper die block 120 is provided at its lower end with a similar axial bore 121a in which is mounted the upper die 30. Each die is held in place by a socket set screw 124 engaging a threaded aperture extending through a boss in the front side of the die block. These set screws are accessible through the slots between the plates 121, as shown in Fig. 1. In order to support the dies 29 and 30 independently of the set screws 124, the die blocks 119 and 120 are provided with internal supporting pins 125 which extend through apertures in the die blocks with their ends 125a seating against the dies. Each pin 125 has a threaded portion 125b which engages a threaded part of the aperture of the die block in which it is mounted and each pin is provided at its outer end with a hexagonal recess 125c adapted to be engaged by a socket wrench for effecting the adjustment of the pin to correspond with the position of the die, 29 or 30, which is engaged thereby. Each pin 125 is engaged at its outer threaded end by a lock nut 126 which holds it in adjusted position. By this arrangement the dies may be secured in the desired position to coact with strip material of various gauges and after the dies have been adjusted the pins 125 may be adjusted in the die blocks to give adequate support to the dies during the welding operation. Of course, this arrangement also permits the dies 29 and 30 to be interchanged with other dies of different lengths and having projections and recesses of different widths and depths to accommodate strips of various widths and gauges.

The lower die block 119 is provided at its lower end and on opposite sides with a pair of rectangular notches 119b and the upper die block 120 is similarly provided with opposite rectangular notches 120b. These notches are engaged by the rounded extremities 127a of the bifurcated forward arms of operating levers 127 which are pivotally mounted on shafts 128 secured in bearings carried by the side frame members 21b. These levers extend rearwardly between the side frame members 121b and are pivotally connected by pins 129 with actuating links 130 which, when the dies 29 and 30 are in engagement with each other, extend substantially in vertical directions as shown in Fig. 9. The links 130 extend between the side flanges 131a of a block 131 which is formed on the end of a piston rod 132 and the links are pivotally connected to this head 131 by means of a pin 133. The piston rod 132 extends through an aperture formed in the end wall 21f of the upright frame, as shown in Fig. 9, and through an aperture formed in the head 135a of a cylinder 135. A piston 136 is mounted in this cylinder for actuation by compressed air admitted thereto as hereinafter described. A stuffing box 135b is formed in the head 135a around the piston rod 132 and it is filled with packing material 137 adapted to be compressed by a packing gland 138 surrounding the piston rod and entering the other portion of the stuffing box with its annular flange secured to the head 135a.

As shown in Fig. 5, the cylinder 135 is provided at its other end with a detachable head 139 and the two heads 135a and 139 are secured together by longitudinal bolts 140 engaged at their rear threaded ends by the nuts 141 and washers 142. Compressed air or other medium under pressure is adapted to be admitted to the forward end of the cylinder 135 through a pipe 143 which is mounted in the head 135a to communicate with a port 135c leading to the forward end of the chamber of the cylinder. Another supply pipe 144, for compressed air or the like, has its discharge end mounted in the rear cylinder head 139 to communicate with a port 139a formed therein so that compressed air may be admitted to the rear end of the cylinder when desired. The admission of compressed air or other operating medium to the opposite ends of the cylinder 135 through the pipes 143 and 144 is controlled by an automatic valve mechanism 145 to which the compressed air or other medium is supplied through a pipe 146. With the foregoing arrangement, it will be apparent that upon admission of compressed air or other fluid to the rear end of the cylinder 135 through the pipe 144, the piston 136 will be forced to the position shown in Fig. 9, thus actuating the toggle mechanism made up of the links 130 and the levers 127 to effect the movement of the dies 29 and 30 to the forging or welding position where they contact with each other. Upon admission of compressed air or other medium through the pipe 143 to the forward end of the cylinder 135, the piston 136 is moved in the opposite direction and the toggle mechanism is operated to separate the dies 29 and 30.

The controlling device 145, shown in Fig. 5, comprises a valve 147 for controlling the admission of compressed air from the supply pipe 146 to either of the delivery pipes 143 or 144, and this valve is operated by a solenoid 150 having a movable or magnetizable core 150ª connected by a link 151 with a lever 152. This lever is pivoted at 153 upon the casing of the controlling valve and it is connected at the points 154 and 155 to rod plungers 156 and 157 which are adapted to be actuated by the pivotal movement of the lever to control the admission of compressed air to the pipes 143 and 144, respectively. A coil spring 158 connects the end of the lever 152 which is opposite the link 151 to the base of the controlling valve and this spring tends normally to actuate the lever 152 in such a manner that compressed air is admitted through the pipe 143 to the forward end of the cylinder 135 so that the piston 136 is actuated to operate the toggle mechanism and effect the separation of the welding dies 29 and 30.

In order to obtain the uniformity in the welds or joints which are formed by the operation of the apparatus of the present invention and to insure adequate strength in the joints, it is essential that the lapped ends of the strips be heated to a predetermined extent before the forging operation takes place. Owing to variations in voltage and to variations in the resistance of the overlapping portions of the metal strips which are included in the welding circuit, it is not possible to bring about a uniform and predetermined heating of the overlapping strip ends merely by passing an electric current through the strip ends for a predetermined period of time, and provision has therefore been made for causing a predetermined or fixed amount of electrical energy to pass through the lapped portions of the metal strips preliminary to each forging operation. In Fig. 17, one circuit arrangement by which this result may be accomplished is somewhat diagrammatically illustrated.

As there shown, the winding of the solenoid 150 is shown as being connected across the line between two supply conductors or line wires 160 and 161 leading from a suitable source of electrical energy. There is also connected between the supply conductors 160 and 161 a welding transformer 162, the secondary windings of which are connected through the previously described bar conductors 44 to the overlapping strip ends 26ª and 26ᵇ. The primary winding of this transformer, in addition to being connected to the supply conductors 160 and 161, is included in circuit with the primary winding of a control transformer 163 and also in series with the contacts 164ᶜ of a solenoid 164. The solenoid 164 is also connected between the supply conductors 160 and 161 and in series with a push button switch 165 and the contacts 166ᶜ of another solenoid 166. This solenoid 166 is connected between the supply conductors 160 and 161 and it is in series with contacts 167ᶜ controlled by a solenoid 167. Other contacts 167ᵈ are also controlled by the solenoid 167 and are connected in series with the welding solenoid 150 previously described.

The solenoid 167 has its winding included in a control circuit adapted to be energized by the secondary winding of the control transformer 163 with which it is connected. The winding of the solenoid 167 is connected in series with a neon tube 168 and in series with switch contacts 166ᵈ which are actuated by the solenoid 166 previously described. From the switch contacts 166ᵈ, a conductor leads to a movable contact 169 which is adapted to be connected at a desired intermediate point of the secondary winding of the control transformer 163. The terminals of this secondary winding of the transformer 163 are directly connected to the terminals of a rectifying tube 170 which also has an intermediate terminal connected through a conductor 171 with an adjustable rheostat 172. The movable contact 172ª of this rheostat is connected to a fixed condenser 173 having its other terminal connected to the conductor which leads from the neon tube 168 to the contacts 166ᵈ. Thus, the fixed condenser 173 is connected in parallel with the solenoid 167 and the neon tube 168. This control circuit connected to the secondary winding of the transformer 163 determines the amount of electrical energy which passes through the overlapping ends of the metal strips and the amount of this energy may be varied by regulating the charge of the fixed condenser 173 through adjustment of the rheostat 172.

In the operation of the circuit shown in Fig. 17, assuming that the strips to be welded together have been clamped in the machine and have been properly overlapped as heretofore described, the operator actuates the push button switch 165 which then establishes a circuit between the line conductors through the solenoid 164, the switch contacts 166ᶜ being normally closed. Having closed this circuit by actuating the push button switch, the switch may be released and the circuit will be continued around the switch through a holding circuit including a condenser 174. When the solenoid 164 is energized, it closes the normally open contacts 164ᶜ and thus energizes the primary winding of the welding transformer 162 and also the primary winding of the control transformer 163. The induced welding current in the secondary winding of the transformer 162 then passes between the strip ends 26ª and 26ᵇ for a period which is determined by the operation of the control circuit in which the solenoid 167 is included.

The control transformer 163 being then energized by the closing of the switch 164ᶜ, a current will flow in the control circuit and the fixed condenser 173 will be charged at a rate depending upon the adjustment of the rheostat 172. The contacts 166ᵈ are normally closed and remain closed during this charging operation. At a predetermined time, regulated by the gas filled rectifying tube 170, the condenser 173 will discharge through the neon tube 168 and the solenoid 167, thereby causing the solenoid 167 to close the contacts 167ᶜ and 167ᵈ. When this occurs, the solenoids 166 and 150 are energized so that two operations immediately take place. First, the normally closed switch contacts 166ᶜ are opened, thus opening the circuit of the solenoid 164 and thereby causing the opening of the switch contacts 164ᶜ so that the supply of current to the primary windings of the two transformers 162 and 163 is interrupted. Secondly, the solenoid 150, being energized, actuates the valve 147 to admit compressed air to the cylinder 135 so that the toggle mechanism is immediately actuated to force the two welding dies 29 and 30 toward each other with a welding pressure on opposite sides of the overlapped and heated strip ends. After a welding operation of the dies in this manner, the spring 158 restores the lever 152 to a position wherein compressed air is admitted through the pipe 143 to the other end of the cylinder 135 so that the toggle mechanism is then immediately actuated to effect the separation of the welding dies 29 and 30.

It will be apparent from the foregoing description that there has been provided an improved form of welding mechanism and an improved method of welding according to which a predetermined heating of the overlapped strip ends is obtained before the welding operation takes place and in which the operation of uniting the overlapping strip ends is effected by a forging operation at an ordinary forging temperature, as distinguished from a pure welding operation taking place at a higher temperature in which the metal is in a molten condition. By confining the overlapping strip ends during the forging operation so that the metal cannot flow laterally, it is possible to produce a joint having the same width and thickness as the strip ends which are united and having substantially the same strength. By adjusting the control circuit, it is possible to adapt the apparatus to the heating of metal strips of various gauges and widths and to bring about the desired degree of heating before the forging operation takes place. By adjusting the welding blocks and the dies, the apparatus may be employed with various gauges and widths of metal strips and there will be a certainty of producing on each operation a joint having a predetermined size and strength.

Although one form of the invention has been shown and described by way of illustration, it will be understood that it may be constructed in various other embodiments coming within the scope of the appended claims.

We claim:

1. The method of uniting metal strips, which consists in placing the oppositely directed ends of the strips in overlapping relation in substantially parallel planes, heating the overlapping ends throughout their width to a forging temperature, and then applying a forging pressure to said ends transversely to said planes while confining the metal of said overlapping ends against lateral flow beyond the initial width of said strips at the place of overlap.

2. The method of uniting metal strips, which consists in placing the oppositely directed ends of the strips in overlapping relation by placing the strips in alignment and effecting movement of one of them through an arcuate path until it overlaps the other end, then heating the overlapping ends by passing an electric current therethrough, and then applying a forging pressure to said ends while restraining the metal of the overlapping ends against lateral flow beyond the initial width of said strips.

3. The method of uniting metal strips, which consists in placing the oppositely directed ends of the strips in overlapping relation in substantially parallel planes, heating the overlapping ends, and then applying a forging pressure to said overlapping ends while restraining the metal of said ends against lateral flow beyond the initial width of said strips and permitting the longitudinal flow of the heated metal at the place of overlap.

4. The combination in apparatus of the class described, of means for gripping the ends of two metal strips at points removed from their extremities and holding portions of said ends in overlapping relationship with their ends directed in opposite directions in parallel planes, means for heating the overlapping end portions of said strips throughout their widths to a forging temperature, the portions of said strips between said gripping means being adapted to dissipate the heat developed in the overlapping portions, and means independent of said heating means for forging said overlapping ends while retaining them in the position in which they are heated.

5. The combination in apparatus of the class described, of means for holding two metal strips with their ends in substantial alignment, means for moving one of said holding means through an arcuate path to cause one strip end to overlap the other strip end with a wiping action, means for heating the overlapping ends by the passage of an electric current therethrough, and means for applying a forging pressure to the overlapping heated ends.

6. The combination in apparatus of the class described, of means for holding two metal strips, means for moving one of said holding means to cause the end of one strip to overlap the end of the other strip with a wiping action, means for heating the overlapping ends of said strips, a pair of forging dies, and means for actuating said dies to forge the overlapping heated ends of said strips, said dies having parts adapted to enclose said heated ends to prevent flow of the metal transversely to the longitudinal axes of said strips when the forging pressure is applied.

7. The combination in apparatus of the class described, of a pair of clamping blocks, means for clamping metal strips on said blocks in substantial alignment, a gauge for positioning the ends of said strips in definite spaced relation, and means for moving one of said blocks to cause the ends of said strips to overlap and for simultaneously removing said gauge.

8. The combination in apparatus of the class described, of a pair of blocks each adapted to support a metal strip, a gauge against which the ends of said strips are adapted to be positioned, means for securing said strips on said blocks, means for effecting relative movement of said blocks to cause the ends of said strips to overlap, and means for simultaneously moving said gauge out of alignment with said strips.

9. The combination in apparatus of the class described, of a pair of blocks each adapted to support a metal strip, a gauge against which the ends of said strips are adapted to be positioned, means for securing said strips on said blocks, means for effecting relative movement of said blocks to cause the ends of said strips to overlap, and means actuated by the operation of said last-named means for removing said gauge to permit said overlap.

10. The combination in apparatus of the class described, of a pair of blocks, each adapted to support a metal strip in substantial alignment with the strip on the other block, a gauge adapted to be engaged by the ends of said strips, means for clamping said strips on said blocks, means comprising an eccentric for moving one of said blocks through an arcuate path to cause the end of one strip to overlap the end of the other strip, and means actuated during the rotation of said eccentric for withdrawing said gauge.

11. The combination in apparatus of the class described, of a pair of blocks, each adapted to support a metal strip in substantial alignment with the strip carried by the other block, a gauge adapted to be engaged by the ends of said strips, means for clamping said strips on said blocks, means comprising an eccentric for moving one of said blocks through an arcuate path to cause the end of one strip to overlap the end of the other strip, and a cam actuated during the rotation of said eccentric for causing the withdrawal of said gauge.

12. The combination in apparatus of the class described, of a pair of blocks each adapted to support a metal strip, a pair of clamping members each adapted to engage a strip on one of said blocks, independently operated means for securing each clamping member in its clamping position, and separate manually operated means for holding one of said clamping members in its clamping position preliminary to the operation of the securing means associated with that clamping member.

13. The combination in apparatus of the class described, of a pair of blocks each adapted to suport a metal strip, a pair of clamping members each adapted to engage a strip on one of said blocks, independently operated means for securing each clamping member in its clamping position, separate manually operated means for holding one of said clamping members in its clamping position preliminary to the operation of the holding means associated with that clamping member, and means actuated after said manually operated means has been operated to hold one of said strip ends for moving one of said blocks to bring the ends of said strips into overlapping relation.

14. The combination in apparatus of the class described, of a block adapted to support a metal strip, a clamping member for securing said strip on said block, a manually operated lever for causing said clamping member to hold said strip on said block, and additional foot operated mechanism having a part adapted to engage said clamping member for holding said clamping member in engagement with said strip independently of said manually operated means.

15. The combination in apparatus of the class described, of means for holding a pair of strips with their ends overlapping, a pair of die blocks movable transversely to said strip ends, welding dies carried by said blocks, means for adjusting the positions of said dies in said blocks, and means for effecting relative movement of said blocks.

16. The combination in apparatus of the class described, of means for holding a pair of strips with their ends overlapping, a pair of die blocks movable transversely to said strip ends, welding dies carried by said blocks, fluid pressure operated toggle mechanism adapted to effect relative movement of said die blocks, means for heating the overlapping ends of said strips, and means actuated after a predetermined heating of said strip ends for actuating said fluid pressure operated toggle mechanism.

17. The combination in apparatus of the class described, of means for holding two metal strips with their oppositely directed ends overlapping in parallel planes, means for heating said overlapping ends throughout their width, means for applying a forging pressure to said overlapping ends while they are heated, and means for confining the metal of the overlapping ends against flow transversely of said strips beyond the initial width of said strips during the application of said pressure.

18. The combination in apparatus of the class described, of a pair of welding dies, one of said dies having a groove adapted to receive a strip to be welded, the other of said dies having a projection adapted to enter said groove, means for holding two strip ends with their ends overlapping, means for heating the overlapping strip ends, and means for effecting relative movement of said dies to enclose said overlapping ends and apply a forging pressure thereto.

19. The combination in apparatus of the class described, of means for holding two metal strips with their ends in substantial alignment, means for moving one of said holding means to cause one strip end to overlap the other, means for heating said overlapping strip ends, and means for applying a forging pressure to the overlapped ends while said ends are in the position in which they are heated.

CHESTER M. MacCHESNEY.
WILLIAM SCHROEDER.